United States Patent [19]

Herman et al.

[11] Patent Number: 5,050,075

[45] Date of Patent: Sep. 17, 1991

[54] HIGH PERFORMANCE VLSI DATA FILTER

[75] Inventors: Gary E. Herman, South Orange; Kuo-Chu Lee, Franklin Township, Somerset County; Takako Matoba, Morristown, all of N.J.

[73] Assignee: Bell Communications Research, Inc., Livingston, N.J.

[21] Appl. No.: 253,240

[22] Filed: Oct. 4, 1988

[51] Int. Cl.⁵ .............................................. G06F 7/22
[52] U.S. Cl. ................................. 364/200; 364/232.8; 364/239.4; 364/262.4; 364/282.1
[58] Field of Search ... 364/200 MS File, 900 MS File

[56] References Cited

U.S. PATENT DOCUMENTS

| | | | |
|---|---|---|---|
| 4,241,402 | 12/1980 | Mayper, Jr. et al. | 364/200 |
| 4,384,325 | 5/1983 | Slechta, Jr. et al. | 364/200 |
| 4,450,520 | 5/1984 | Hollaar et al. | 364/200 |
| 4,464,718 | 8/1984 | Dixon et al. | 364/200 |
| 4,504,907 | 3/1985 | Manning et al. | 364/200 |

OTHER PUBLICATIONS

"Systolic (VLSI) Arrays for Relational Database Operations", H. T. Kung and Philip L. Lehman, Proceedings of the Association for Computing Machinery, pp. 105-116, May 1980.

"Realization of Efficient Non-Numeric Operations Through VLSI", Timothy W. Curry et al., Proceedings of VLSI '83, 1983.

"Intelligent String Search processor to Accelerate Text Information Retrieval", K. Takahashi et al., Proceedings of Fifth Int'l Workshop on Database Machines, pp. 440-453, Oct. 1987.

"Database Machine and Database Management", E. Ozkarahan, pp. 236-255, Englewood Cliffs, N.J., Prentice Hall, Inc., 1986.

Primary Examiner—Michael R. Fleming
Assistant Examiner—Debra A. Chun
Attorney, Agent, or Firm—James W. Falk; Leonard Charles Suchyta

[57] ABSTRACT

A single chip high speed VLSI data filter is disclosed. The data filter performs relational and simple numeric operations on a high speed input data stream using a unique instruction set containing no branching instructions.

11 Claims, 3 Drawing Sheets

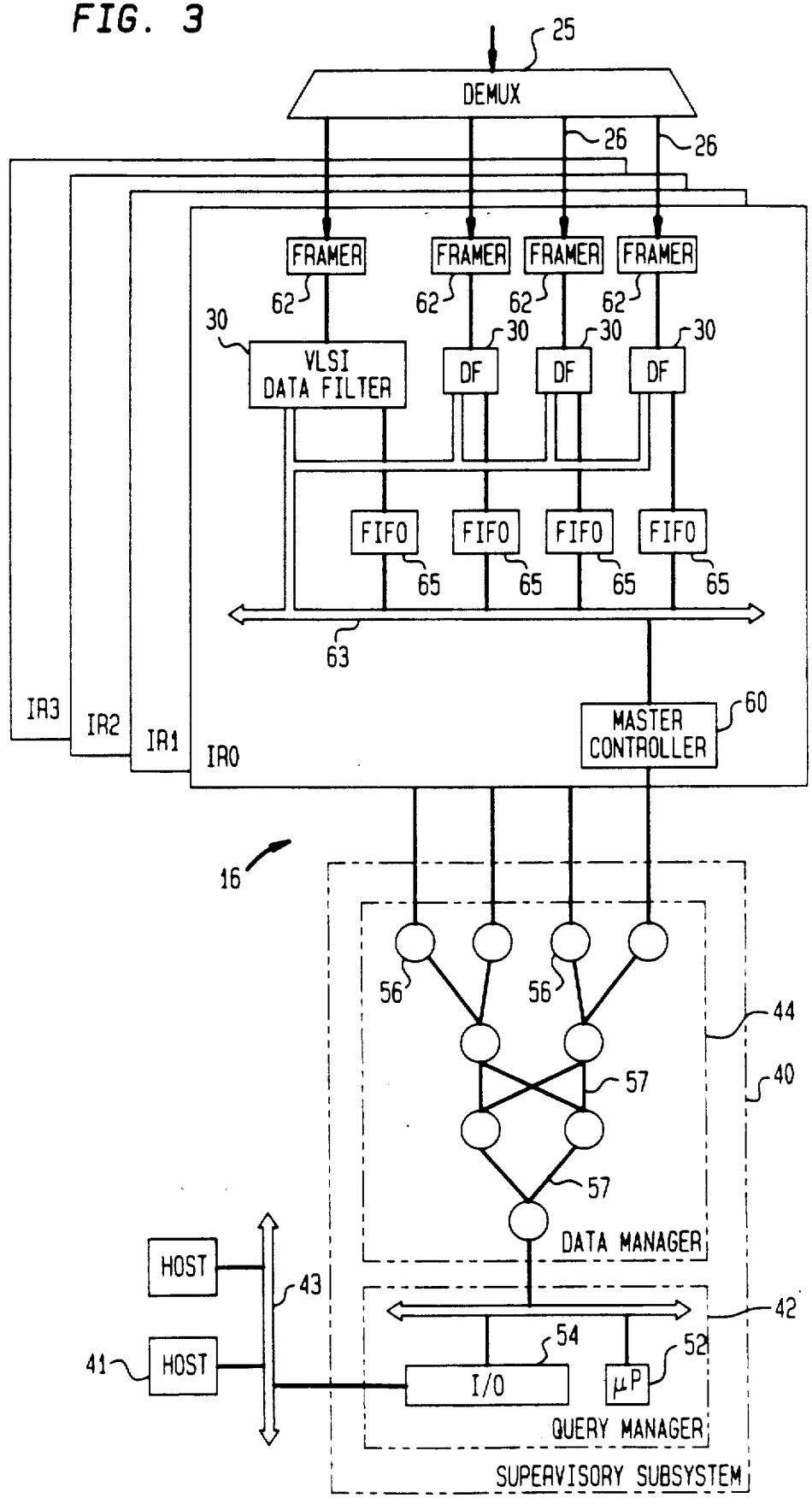

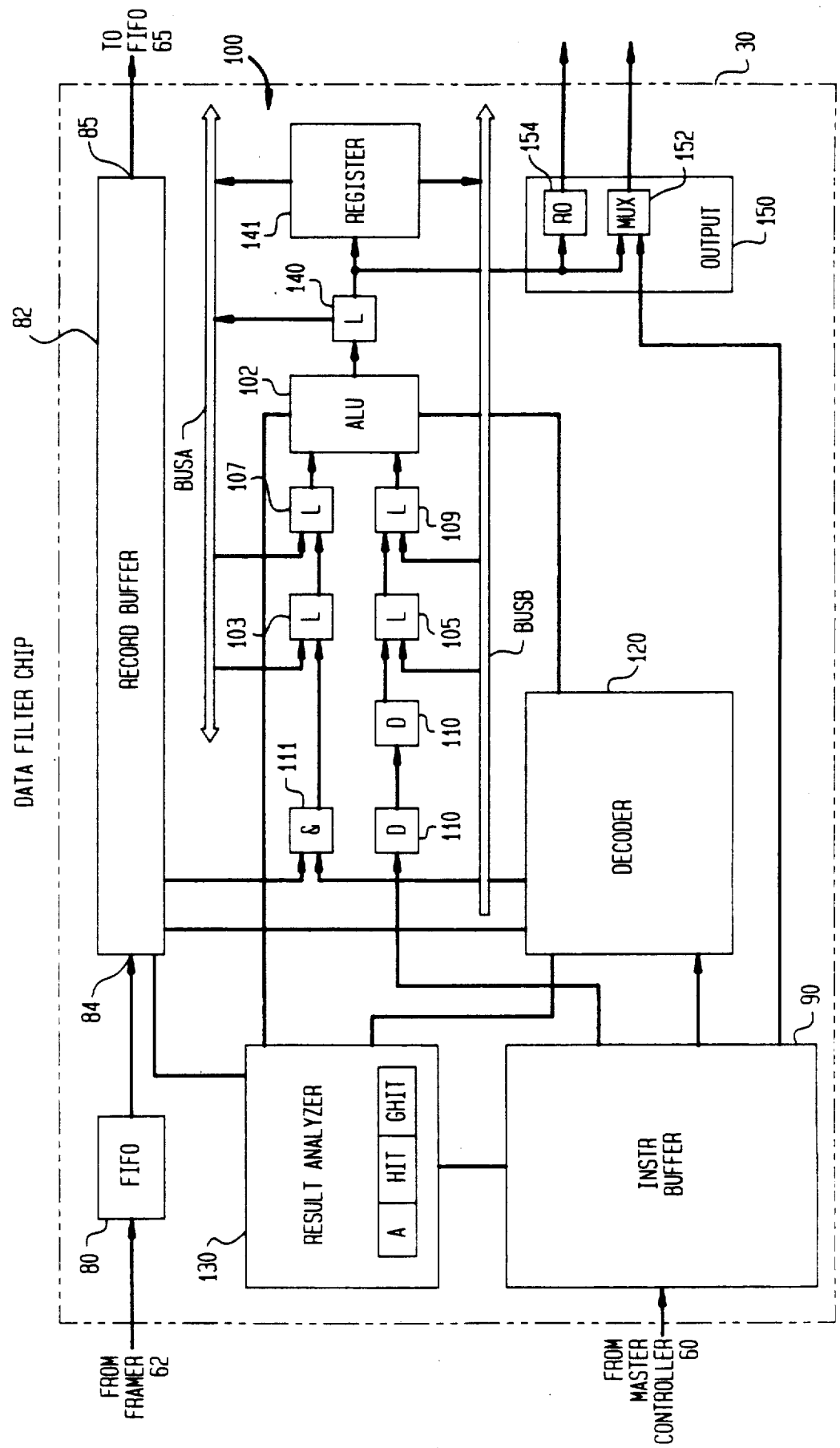

HIGH PERFORMANCE VLSI DATA FILTER

FIELD OF THE INVENTION

The present invention relates to a single chip VLSI high speed data filter for performing relational and simple numeric operations on a high speed input data stream. The present invention also relates to a set of instructions which can be executed by the high speed data filter.

BACKGROUND OF THE INVENTION

U.S. patent application Ser. No. 888,733 entitled "Architecture For A Storage Access System For High Performance Computer System" discloses a database system architecture intended to support very high levels of query throughput, a powerful query language, rapid execution of complex queries, and full control of concurrently executing queries to preserve database consistency in the face of updates. The above-identified patent application was filed for E. J. Gaussman, K. S. Grewal, and G. E. Herman on July 21, 1986 is assigned to the assignee hereof and is incorporated herein by reference.

The strategy in the architecture is to broadcast the contents of a database repetitively over a high speed transmission medium to a multitude of "listening processors" that observe the database in the form of a high speed bit stream. Data filters may be used to extract information relevant to queries pending locally at the "listening processors".

Illustratively, the database is divided into records and queries are typically directed to identifying particular records. Each record typically comprises a number of attributes. An example of a pending query might be to find a phone number from a database whose records comprise individuals and their phone numbers. Another example of a query might be to count the number of individuals earning over fifty thousand dollars per year in a database whose records comprise employment information.

Desirably, each "listening processor" or record access manager includes a plurality of data filters. A data filter may be defined as a device which interfaces a conventional relatively low speed processor with a high speed data stream in order to obtain certain data from the high bit rate data stream in response to instructions from the conventional low speed processor. Such data filters play a particularly important role in the database architecture described above because they are the devices which actually execute the locally pending queries. The architecture operates most efficiently when high speed, highly efficient data filters are used to extract desired information from the cyclically broadcast high speed data stream.

Currently available data filters are generally not fast enough to make a database architecture in which database contents are cyclically broadcast commercially viable. Many presently available data filters use multiple comparator arrays which exhibit significant amounts of redundancy in hardware resources. Examples of such data filters may be found in Kung, H. T. and Lehman, P. L., "Systolic (VLSI) Array for Relational Database Operations," *Proceedings of ACM-SIGMOD* 1980, May 1980; Curry, T. and Mukhopadhyay, A, "Realization of Efficient Non-Numeric Operations Through VLSI", *Proceedings of VLSI '83*, 1983; Ozkarahan, E., *Database Machines and Database Management*, Englewood Cliffs, N.J., Prentice/Hall, 1986; Takahashi, K., Yamada, H., and Hirata, M., "Intelligent String Search Processor to Accelerate Text Information Retrieval", *Proceedings of Fifth Int'l Workshop on Database Machines*, pp 440-453, Oct., 1987. The data filters described in these references have either low utilization of comparator resources or utilize significant amounts of redundant comparisons on attributes that are not of interest. Such data filters based on comparator arrays are also limited due to the lack of parallelism resulting from the processing of data one byte at a time.

Another prior art approach to data filtering involves the use of a general purpose processor and external buffer management techniques (see e.g. Ozkarahan, E., "*Database Machine and Database Management*, pp. 236-255, Englewood Cliffs, N.J, Prentice Hall, Inc., 1986). While general purpose processors can take advantage of comparing multiple bytes at a time, they suffer performance degradation when used in data filter applications involving the repetitive execution of the same instructions with respect to each record in a database in the form of a high speed data stream. One reason for the performance degradation is the need for repetitive off-chip instruction and attribute fetch. Another reason for the degradation is that the instruction sets utilized by general purpose processors are not designed for query applications wherein the same group of instructions is repetitively executed.

The instruction set of a general purpose processor usually includes branching instructions. This means that the instructions provided to the processor are not necessarily executed in sequence. Accordingly, pipeline processing is not used most efficiently in such processors. Any time processing branches to an instruction that is not next in sequence, the entire pipeline must be flushed. Thus, in data filter applications requiring execution of the same group of instructions for each record in a database bit stream in order to identify a small subset of records, large numbers of pipeline flushes can be expected. Such pipeline flushes significantly reduce performance.

In view of the above, it is an object of the present invention to provide a high speed data filter for performing relational and simple numeric operations on a high speed data bit stream.

It is a further object of the present invention to provide a data filter for carrying out queries in a database system architecture wherein a database comprising a sequence of records is cyclically broadcast over a high speed downstream transmission medium.

It is a further object of the invention to provide a data filter in the form of a processor having a unique architecture and a unique instruction set especially adapted for carrying out query operations on a high speed bit stream, which data filter overcomes the shortcomings of the prior art data filters and general purpose processors described above.

SUMMARY OF THE INVENTION

The present invention is data filter which utilizes a unique architecture and a unique instruction set to carry out queries on a high speed data stream in form of a database organized into records. The data filter of the present invention is able to carry out database queries faster and more efficiently than prior art data filters. The data filter of the present invention is preferably implemented as a single chip using VLSI.

The data filter contains a pipeline processing unit including an arithmetic logic unit which is intended to process instructions in a pipelined fashion. Each record from the high speed data stream is buffered in the data filter for a sufficiently long period of time so that a batch of instructions requiring information contained in a record can be carried out before the record is removed from the data filter. The same instruction batch is executed on each record comprising the high speed bit stream. Because the same instructions are executed repeatedly, significant improvement in efficiency is achieved if the instructions are stored on-chip rather than off-chip as in the case of conventional processors. In the data filter of the present invention, the stored batch of instructions is executed in a pipelined fashion using the pipeline processing unit.

The instruction set, from which an instruction batch to be executed by the filter is derived, is unique in that no branch instructions are utilized. Thus, in the data filter of the present invention, a stored batch of instructions is always executed in order. In contrast to prior art processors, it is never necessary to flush the pipeline because a result of a comparison causes a branch to an instruction which is not the next instruction in the instruction batch. The use of an accumulator (designated A herein) to store intermediate comparison results is key to the instruction set of the data filter of the present invention.

The instructions of the unique instruction set are generally of the format

OPr, OPa (Memory, Pattern).

To execute this instruction, a portion of each record designated by Memory, is compared to a Pattern which is supplied by the query. OPa is an opcode which defines a test to be performed on the comparison result. OPa includes tests such as equal, greater than, or less than, etc. OPr is an opcode which tells what to do with the result of the test; in particular how to utilize the result of the test in combination with the accumulator A. Thus each instruction of this form really comprises three operations, a comparison between a portion of a record designated by Memory and Pattern, a test performed on the comparison result, and an operation which utilizes the result of the test and the accumulator A. By using instructions of this form, queries involving multiple Boolean predicates can be evaluated without the use of branch instructions.

In particular embodiments of the invention, the instruction set may be generalized to include conditional assignment instructions of the form If A OPalu (M1, M2, M3)

where M1 and M2 indicate operands or storage locations where operands can be found and M3 indicates a location where a result is stored. OPalu is an ALU (arithmetic logic unit) opcode and may signify operations such as add, subtract, move, AND or OR. The instruction is executed as follows. If A is true, perform the operation indicated by OPalu on the operands indicated by M1 and M2 and store the result at M3.

The conditional assignment instruction is important for aggregation operations such as finding the sum of the salaries of all employees over 40 years of age.

High level queries may be represented as short groups of instructions from the unique instruction set of the data filter. The sequence of instructions stored in the chip at any one time may comprise instructions representing a number of such queries. Thus, the data filter may conduct a number of queries at the same time by repeatedly executing the instruction comprising the query with respect to the records in the data stream. Illustratively, if at any time, a record satisfies a particular query, the record is written into an off chip storage device along with an indication identifying the query being satisfied.

The data filter of the present invention, through use of a unique processor architecture and unique instruction set, can achieve a filtering speed that is ten times faster than presently available filter designs. Thus the filter of the present invention is especially useful for carrying out database queries on a database that is cyclically broadcast via a high speed transmission medium.

DETAILED DESCRIPTION OF THE INVENTION

Figures 1, 2:
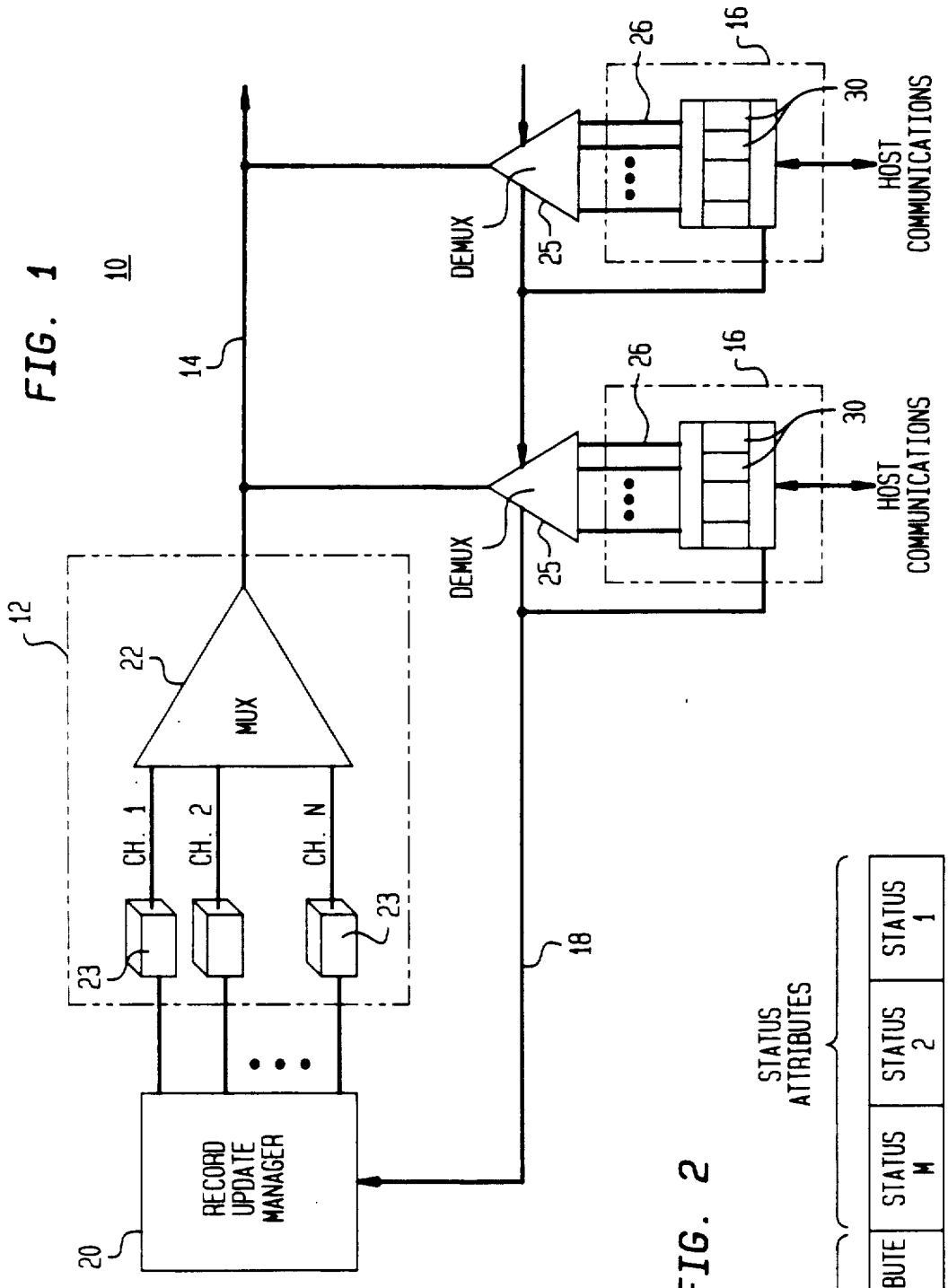
FIG. 1 schematically illustrates a database system architecture wherein a database comprising a sequence of records is cyclically broadcast via a high speed transmission medium.
FIG. 2 illustrates the format of a record in the above-mentioned database, FIG. 3 schematically illustrates the architecture of a record access manager for use in the database system architecture of FIG. 1, in accordance with an illustrative embodiment of the present invention, and FIG. 4 schematically illustrates a data filter for use in the record manager of FIG. 3, in accordance with an illustrative embodiment of the present invention.

The detailed description of the invention is divided into three sections. Section A includes an overview of the broadcast database architecture, Section B describes a unique instruction set for the inventive data filter, and Section C describes the architecture of the inventive data filter.

A. Overview of the Broadcast Database Architecture

FIG. 1 schematically illustrates a database architecture 10 wherein a database is cyclically broadcast via a high speed transmission medium. The components of the architecture 10 are the storage pump 12, the downstream transmission channel 14, the record access managers 16, the upstream update channel 18 and the record update manager 20. The entire contents of the database are repeatedly read from the storage pump 12, broadcast over the high speed transmission channel 14, and observed passively and independently by the many record access managers 16 which act as "listening processors". Each record access manager 16 is associated with a host computer (not shown in FIG. 1) which is a general purpose computing system on which applications reside.

The cyclically broadcast database comprises a sequence of records. Each record in the database appears on the broadcast channel 14 in a form resembling that shown in FIG. 2, that is, a structured sequence of attributes. As shown in FIG. 2, record attributes include both the data values associated with a database record, as well as record status attributes (e.g., record ID, the time the record was last changed, the ID of the entity which last changed the record) used by the architecture 10 for transaction management. Also appearing on the broadcast channel are special bit sequences used to subdivide the database. These special patterns may serve to identify the start and end of a relation (i.e. a subsection of the database), or may be used in indexing strategies to improve search efficiency.

The access managers 16 "read" records from the broadcast stream by means of hardware data filters 30 that compare the values of the relevant attributes of each record appearing in the stream with patterns derived from the queries submitted to the access manager by the host application. To complete a transaction and update the database, a host submits an update/commit request to an access manager 16. Update requests are sent from the access manager 16 to the update manager 20, via the update channel 18. The update manager 20 accepts a subset of requests and introduces the changed records into a storage device 23 comprising part of the pump 12. Success of update attempts is confirmed by the record access managers 16 through use of the data filter 30 by reading the updated records on a subsequent broadcast cycle.

As FIG. 1 indicates, the major system components of the architecture 10 may be constructed from a number of subsystems. Illustratively, the data pump 12 comprises a multiplexer 22 which multiplexes a number of relatively slow data streams Ch1, Ch2 ... ChN from the storage units 23 to form the high speed data stream broadcast via the channel 14. At each record access manager 16, the high speed stream is demultiplexed using the demultiplexer 25 into a number of slower channels 26, each of which operates at a rate suitable for the data filters 30. A need for higher capacity is accommodated by adding new storage subsystems 23 to the pump 12 and new data filters 30 at each of the access managers. Besides providing flexibility in database size, this approach also reduces the clock rate required within the data filter electronics.

A record access manager 16 is shown in greater detail in FIG. 3. The record manager 16 of FIG. 3 comprises supervisory subsystem 40 which in turn includes a query manager subsystem 42 and a data manager subsystem 44. The query manager 42 comprises a general purpose processor 52 and an I/O device 54. The data manager 44 comprises a network of transputers 56 which are interconnected by the links 57. A transputer is a general purpose computer with a data transmission capability. The data manager 44 controls access to the database subchannels 26 through a plurality of Intelligent Record Retrieval units IR0, IR1, IR2, IR3. Each IR unit receives the data base subchannels 26 via a multiplexer 25 (only one of which is shown in FIG. 3). The records comprising the bit streams on the data base subchannels are transmitted via the framer circuits to the data filters 30. There is one framer and one filter for each database subchannel 26. Each IR unit comprises a master controller 60 for managing four VLSI data filter units 30. The data filters 30 perform the query operations on the records comprising the database subchannels.

The processing of a query by the record access manager 16 is described in more detail below. Queries are presented to a record access manager 46 in a high-level database language such as SQL, (see e.g., Date, C. J., "An Introduction to Database Systems: Volume 1, 4th Edition", Reading: Addison-Wesley Publishing Co., 1986) from a host computer 41 via bus 43. The processor 52 translates these queries into a sequence of relational algebraic expressions. An example of such an algebraic expression is:

Select (DATA TYPE) From (RELATION) Where (EXPRESSION) For (REQUESTED)

The DATA TYPE indicates the type of data to be selected from the database such as a record or a fraction of a record. The "RELATION" defines a subset of the database where the record or other data unit may be located. The "EXPRESSION" defines the pattern to be matched for example with a particular record attribute. "REQUESTED" identifies a particular query.

The relational algebraic expressions are passed to the data manager 44 via the I/O device 46. The processors in the data manager 44 translate expressions in the format described above into a sequence of instructions from a unique instruction set that the filters 30 are designed to execute. These instructions are then routed to particular IRs depending on which database subchannels are involved with particular queries and which data filters are available to take additional instructions, etc. The master controller 60 in each IR then distributes the instructions to particular filters 30 via a bus 63. Note, that in general, all of the instructions for a particular query are routed to a single filter 30. When a particular query is satisfied, a record or other information is transmitted from a data filter 30 to a FIFO 65. This record is then delivered to the host computer 41 via the master controller 60, the data manager 44 and the query manager 42.

B. Data Filter Instruction Set

Before discussing the architecture of the data filter 30 in detail, it is useful to discuss the instruction set comprising the instructions which can be executed by the data filter 30.

One important characteristic of the instruction set is that there are no branch instructions. Consider, for example, a query that seeks to find records where $J > K$ and $L < M$ A conventional processor would require five instructions to evaluate the query. These five instructions are
1) compare J with K
2) branch on negative to Other Instruction Address (i.e. instruction 6 below)
3) compare L with M
4) branch on positive to Next Query Address
5) signal that query is satisfied
6) Other Instruction Address These instructions are not always executed in sequence. Instead there are branches to instructions which are not next in sequence.

An instruction set containing branch instructions does not make the most effective use of pipeline processing resources. Every time a branch causes instructions to be executed non-sequentially, the entire pipeline must be flushed. As indicated above, this is a particular disadvantage for data filters which seek to identify particular records or other data units from high speed data streams. Since the instructions comprising a particular query must be executed repeatedly—i.e. once for each record in the data stream—to find the records which satisfy the query, large numbers of pipeline flushes can be expected for each query. In addition, the instruction set utilizing branches requires a relatively large number of instructions for each query. This puts conventional processors which store instructions off chip at a special disadvantage for data filter operations, as the instructions must be fetched from the off chip storage for each record in the database.

In contrast with this conventional type of instruction set, the unique instruction set of the data filter 30 utilizes no branching. This means instructions are always executed sequentially so that pipeline processing is highly efficient. In addition, the architecture of the data filter 30 permits a sequence of instructions to be stored on-chip, facilitating the repeated execution of the instructions. In the instruction set, a single instruction will cause a number of operations to be carried out (so-called CISC philosophy) and in addition, the number of instructions in the instruction set is minimized (so-called RISC philosophy).

The instruction set for the filter 30 is described below. Note that these instructions make use of an intermediate result accumulator designated by the letter A herein. The instruction set is especially suited for data filter operations. The basic instruction set includes instructions of the form OPr, OPa (MEM, P, MASK, ID)

As is explained below, each such instruction includes a comparison between a pattern and a portion of a record, a test of the comparison result and an operation involving the test result. MEM indicates the address of a particular four byte word of a record. In general, the records of a bit stream are sequentially stored in a buffer comprising part of the data filter. The address MEM indicates the address of a particular four byte word in the buffer. P indicates a particular pattern to be compared, with one or more bytes of the four byte word addressed by MEM. Two additional pieces of information may be contained in each instruction. MASK indicates which of the four bytes of word addressed by MEM is to be compared with the pattern P and ID serves to identify the query to which the instruction belongs. Each instruction of the form indicated calls for comparing one or more bytes of MEM with P for every record in the bit stream.

OPa is an opcode which indicates a particular test to be carried out on the result of the comparison. This opcode includes the following test operations which can be carried out on the comparison result.

eq (equal)
gt (greater)
ge (greater than or equal)
lt (less than)
le (less than or equal to)
ne (not equal)
true (unconditional)

These tests indicate whether the comparison is equal, greater than, less than, etc. The result of the test is indicated by the letter "r" herein.

OPr is the opcode for result evaluation. OPr indicates what to do with the result r of the OPa test operation. The possible OPr operations are listed below.

| OPr | Operation |
|---|---|
| push A | A ←r (push r into A) |
| and A | A ←A and r |
| or A | A ←A or r |
| fand A | A ←A and r, GHIT ←1, output ID (This is a final instruction for a query and when a flag GHIT is set to 1, a query ID is outputted and a mechanism is triggered for outputting a record to an application) |
| for A | A ←A or r, GHIT ←1, output ID (This is also a final instruction for a query) |
| pop A | pop A off accumulator stack (This instruction will only be used if the intermediate result accumulator A is replaced by a stack). |

Thus each instruction includes a comparison between a pattern and a portion of each record, a test (Opa) to be performed on the result of the comparison to produce a test result r and an operation (Opr) involving the result r and an intermediate accumulator A which may contain previous comparison results. The combined comparison, test and test result evaluation in a single instruction allows direct evaluation of queries without the use of branch instructions. Using instructions of this type, the data filter 30 supports streamlined result evaluation without pipeline flushes. Some instructions may include more than a comparison test, and result evaluation. For example, the fand A instruction includes, in addition to a comparison, a test, and a test result evaluation, a mechanism for outputting a query ID and a query result.

Using the above-described instruction set, the query $J > K$ and $L > M$
may be carried out as follows push A, gt (J,K,,) (set accumulator A if $J > K$)
fand A, lt (L,M,) (if A and $L < M$ set GHIT flag and output query ID) The first of these two instructions compares J with K, and if the test of the comparison result indicates J is greater than K, the accumulator A is set to logic "1". Otherwise, the Boolean accumulator A is set to logic "0". The second instruction compares L and M and tests the comparison result using a less than operation. The result of this test is evaluated by ANDing with the intermediate result stored in A, and if this result evaluation is logic "1", then the query ID is outputted and a mechanism is triggered for reading the particular record out of the filter 30. Note the two instructions are evaluated over and over again for each record in a data stream to identify those records which satisfy the query. Such highly concurrent instructions are much more suitable for executing database queries than conventional processor instructions.

The set of instructions described above can be generalized to include an additional instruction. The additional instruction, known as a conditional assignment, is especially useful in certain operations such as counting or summing operations where for example one wishes to sum the salaries of employees making more than 40K per year.

In a general purpose processor, the conditional assignment is implemented by a comparison followed by a branch if the comparison is negative and then the assignment instructions for the comparison result if the comparison is positive. Hence the name conditional assignment. In the instruction set of the data filter 30, conditional assignment may be implemented using a single instruction without branching.

The conditional assignment instruction form is:

If A, OPalu (M1, M2, M3)

OPalu is an opcode for an ALU (arithmetic logic unit) operation such as add, subtract, AND, OR etc. M1 and M2 specify operands or operand locations in the data filter, such as a record buffer or a pattern buffer which stores patterns to be compared with record attributes stored in a record buffer, and M3 is a destination address. The conditional assignment instruction is interpreted as follows. If A is true, perform the operation OPalu on the operands indicated by M1 and M2 and put the result in M3.

Consider a typical aggregation operation which utilizes a conditional assignment instruction such as "find the total salary of employees over age 40". This can be implemented using general processor instructions as follows.
1) compare age with 40
2) branch less to Input Next Record
3) add salary to sum
4) Input Next Record and Repeat This means that if the result of the first instruction is negative, there is a branch to the fourth instruction. Since the instructions are executed repeatedly, i.e. one for each record in the database, there is likely to be a large number of branches and a large number of pipeline flushes.

The same query can be handled using the unique instruction set disclosed herein using only two instructions. These are push A, gt (age, 40) (set A if age is greater than 40)
 If A, add (salary, SUM, SUM) (if A is set for any record, then add salary to SUM and put the result in the SUM location)

These instructions may be executed repeatedly for each record in the database to find the total of the desired salaries without any branching.

Of course, the instructions comprising the instruction set can be combined in a large variety of ways to perform a variety of operations on the data stream. It is beyond the scope of this description to provide more than the illustrative examples mentioned above.

C. Data Filter Architecture

The architecture of a data filter 30 which executes the instructions of the above described instruction set is illustrated in FIG. 4. Preferably, the data filter 30 is implemented as a single clip using VLSI. The data filter 30 of FIG. 4 accepts records from a framer 62 (see FIG. 3) illustratively at a rate of 64 m byte/sec. The records are received in a FIFO 80 and then transmitted to a record buffer 82.

Illustratively, the record buffer 82 is implemented as a bi-buffered tri-port RAM including an active buffer and a non-active buffer (not shown). Thus, while a previous record is being moved from the non-active buffer to the output port 85, the current record in the active buffer is being processed using a batch of instructions, and a next record is being written into the non-active buffer via port 84. A batch of instructions from the above-described instruction set is stored in the instruction buffer 90 which is located on the data filter chip. The instruction buffer 90 may be implemented as a bi-buffered dual port RAM comprising an active buffer (not shown) for a batch of instructions being executed and a non-active buffer (not shown) for instructions which are not currently being executed. Thus, while one batch of instructions in the active buffer is being executed, a new batch of instruction is being written into the non-active buffer. Each record is stored in the buffer 82 long enough so that all the instructions in the instruction buffer can be executed with respect to that record.

To process instructions, the data filter includes a micro-engine 100 including an ALU 102. The micro-engine 32 is highly pipelined. A pair of operands such as one or more bytes from a record and a pattern from the instruction are entered into the receiving latches 103, 105 and then transferred to the ALU operand latches 107, 109. An operation on these operands is then performed by the ALU 102. The operands from the instruction buffer 90 arrive at the latches 105 via the latches 110. Operands from the record buffer 82 arrive at the latch 103 via the AND gate 111. Illustratively, the ALU 102 carries out a comparison (i.e. a subtraction) and transmits the result of the comparison to the result analyzer 130 which carries out OPa and OPr operations. More particularly, the ALU includes a number of ALU flags (not shown) such as EQ, LT, GT which are set as a result of the comparison. These flags are transmitted to the result analyzer 130. The flags are tested by the result analyzer 130 according to the OPa opcode and the result of the test is processed according to the OPr opcode. The register 141 which is connected to the ALU 102 via a temporary latch 140 is used to store the results of conditional assignment instructions. The buses A and B are used to move operands from the register 141 to the latches 103, 105, or from the temporary latch 140 to the latches 107, 109 when a conditional assignment instruction is being executed. Records are outputted via the port 85 and query numbers and data from register 141 are outputted from the filter 30 via the output device 150.

The operation of the data filter 30 of FIG. 4 can be more completely understood by considering the execution of one or more instructions in detail. The data filter 30 of FIG. 4 executes an instruction in five pipelined stages including instruction fetch, instruction decode, operand fetch, execute, Boolean evaluation/store, and output ID.

Consider the following instructions for a query designated query #3 whose purpose is to identify and retrieve a record for a person whose name is KEN and whose phone number is 7329855.

push A eq (NAME, KEN, 0011,3)
 fand A eq (PHONE #, 7329855, 1100, 3)

It is assumed that these instructions are stored in the query buffer 90.

To execute the first instruction, the instruction is fetched from the instruction buffer 90 and decoded by the decoder 120. The decoder transmits the MASK field to the AND gate 111, the memory address NAME to the buffer 82, the opcode for a comparison (i.e. a subtract) to the ALU 102 and the opcodes OPa=eq and OPr=push to the result analyzer 130. The pattern P=KEN is entered into the latch 110 and the NAME attribute of the current record is sent to the AND gate 111 from the buffer 82, where it is combined with MASK=0011 so that only the appropriate bytes of the NAME attribute are compared with P=KEN in the ALU 102. Following the comparison, the ALU flags are transmitted from the ALU 102 to the result analyzer 130. The result analyzer 130 looks at the ALU flags and if the EQ flag is set, the test result r is set. The test result r is then written into the intermediate accumulator A.

While the first instruction is being executed the second instruction is fetched from the instruction buffer 90 and is decoded. The record portion at the address PHONE # is retrieved from the record buffer 82 and is combined with the MASK=1100 so that only the first two bytes are compared with the pattern 7329855. The result of the comparison (i.e. the ALU flags) is then transmitted to the result analyzer 130. The result analyzer 130 then tests the result of the comparison using the OPa=eq operation. If the test is positive (i.e. logic "1"), the HIT and GHIT flags are set. This causes the record to be written into FIFO 65 (see FIG. 3) via port 85 and query number (i.e. 3 in this case) to be outputted from the instruction buffer 90 via the multiplexer device 152 which form part of the output circuit 150.

It is useful to consider a further example involving a conditional assignment.

Consider execution of a query designed to count the number of employees over age 40. To execute the query, records relating to employees have to be identified. From the employee records, records relating to employees over age 40 have to be identified and the number of employees over age 40 has to be counted.

(1) push A eq (relation, first employee, mask, 4)
(2) If A movb (null, 0, R2)
(3) push A eq (relation, employee, mask 4)
(4) and A gt (age, 40, mask, 4)
(5) If A add (1, R2, R2)
(6) push A eq (relation, last employee, mask, 4)
(7) If A mova (R2, null, R0)

The first two instructions are initialization instructions. Instruction #1 causes the intermediate accumulator A to be set if the "relation" portion of a record indicates it is the first employee record. When this record is identified, the storage location R2 in the register 141 is set to zero through use of the "movb" opcode of instruction #2. Instruction #2 is a conditional assignment type instruction which moves the second field of the instruction into the storage location designated by R2. Note that even though the first two instructions are initialization instructions, they are executed for each record in the data base since no branching is permitted. However, the R2 storage location is only initialized to zero for the record that is the first employee record.

Instructions #3 and #4 are executed in the manner described above to identify those records which are employee records (Instruction #3) and, of the employee records, those records belonging to employees over 40 (Instruction #4). Instructions #3 and #4 result in the setting of the intermediate accumulator A for records belonging to employees over age 40.

Instruction #5 is a conditional assignment instruction. When the intermediate accumulator A is set, the ALU operation "add" is carried out so that R2 and 1 are added together and the result is stored in R2. Note that the field "1" is treated like a pattern and is transmitted to the latches 110 then to the latches 105 and 109. The contents of Register R2 is transmitted via bus A to the latch 103 and from there to the latch 107.

Instruction #6 and #7 do the output. Instruction #6 identifies the last employee. Instruction #7 is a conditional assignment instruction wherein the ALU operation "mova" moves the first field in the instruction (i.e. the contents of R2) to R0 where R0 is register 154 forming part of the output device 150. This output operation is triggered only for the last employee record.

Illustratively, in a conditional assignment instruction, there are four combinations from where the operands may be fetched. These are:

register—register (using Bus A and Bus B)
memory—register (record buffer and Bus B)
register—pattern (Bus A and pattern from instruction)
memory—pattern (record buffer and pattern from instruction)

CONCLUSION

A single chip high speed VLSI data filter is disclosed. The data filter performs rational and simple numeric operations on a high speed data stream using a unique instruction set containing no branching instruction. Finally, the above-described embodiments of the invention are intended to be illustrative only. Numerous alternative embodiments may be devised by those skilled in the art without departing from the spirit and scope of the following claims.

We claim:

1. A data filter for performing queries on a high speed data stream organized into a sequence of records which form a database, said data filter comprising buffer means for receiving and buffering each of said records forming the high speed data stream in sequence, memory means for storing a batch of instructions arranged in a specific order for carrying out a query in response to a request for information from the database, pipelined processing means in communication with said buffer means and said memory means for executing said instructions stored in said memory in said specific order for each of said records while each record is buffered in said buffer means, and intermediate result accumulation means in communication with said processing means for storing an output of said processing means resulting from the execution of particular ones of said instructions by said processing means and for providing an input to said processing means for enabling said processing means to execute subsequent ones of said instructions depending on the contents of the intermediate result accumulation means.

2. The data filter of claim 1
wherein at least some of the instructions stored in said memory means include a pattern and an address indicating a portion of each record to be compared with the pattern, a first opcode for indicating a test to be performed on an output of the comparison, and a second opcode indicating an operation to be performed on an output of said test, and wherein said pipelined processing means comprises an arithmetic logic unit for performing said comparison, means for performing said test on the output of said comparison, and means for performing said operation on an output of said test and for storing the output of said operation in said intermediate result accumulation means.

3. The data filter of claim 2 wherein said operation utilizes as a first input the output of said test and as a second input the contents of said intermediate result accumulation means.

4. The data filter of claim 2 wherein said instructions stored in said memory include a conditional assignment instruction in which said arithmetic logic unit performs an operation on first and second operands stored in said filter depending on the contents of said intermediate result accumulation means.

5. The data filter of claim 1 wherein said intermediate result accumulation means comprises a one-bit storage means for storing a logic "1" or a logic "0".

6. The data filter of claim 1 wherein said intermediate result accumulation means comprises a stack.

7. The data filter of claim 1 wherein said pipelined processing means is in communication with said memory means via a decoder for decoding said instructions.

8. A data filtering method for performing queries on a high speed data stream comprising a plurality of records which form a database, said method comprising the steps of buffering in a buffer each of the records comprising said high speed data stream in a sequence, storing in a memory a batch of instructions arranged in a specific order for carrying out a query on the records of said high speed data stream in response to a request for information from said database, executing said instructions stored in said memory utilizing a pipelined processor in said specific order for each of said records while each record is buffered in said buffer, said pipelined processor being in communication with said buffer and said memory, and storing an output of said processor resulting from the execution of particular ones of said instructions by said pipelined processor in an intermediate result accumulator in communication with said processor and utilizing the contents of said intermediate result accumulator as an input to said processor for the execution of subsequent ones of said instructions depending on the contents of said intermediate result accumulator.

9. The method of claim 8 wherein the step of executing at least one of said instructions comprises the steps of comparing a pattern contained in the instruction with data contained in the record currently in the buffer, performing a test on an output of the comparison in accordance with a first opcode contained in the instruction, performing an operation on an output of the test in accordance with a second opcode contained in the instruction, and storing the output of said operation in said intermediate result accumulator.

10. The method of claim 9 wherein the inputs to said operation are the output of said test and the current contents of said intermediate result accumulator.

11. The method of claim 9 wherein one of said instructions stored in said memory is a conditional assignment in which case said execution step comprises
performing an operation on an operand contained in said filter depending on the contents of said intermediate result accumulator.

* * * * *